United States Patent
McBurnett et al.

(10) Patent No.: US 10,077,116 B2
(45) Date of Patent: Sep. 18, 2018

(54) COMPRESSED GAS TANK ASSEMBLY

(71) Applicant: Goodrich Corporation, Charlotte, NC (US)

(72) Inventors: Wilfred Ray McBurnett, Chandler, AZ (US); Jayant V. Deshpande, Chandler, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 14/663,125

(22) Filed: Mar. 19, 2015

(65) Prior Publication Data

US 2016/0272337 A1    Sep. 22, 2016

(51) Int. Cl.
*F17C 13/08* (2006.01)
*F17C 1/06* (2006.01)
(Continued)

(52) U.S. Cl.
CPC ............ *B64D 37/04* (2013.01); *B64D 37/06* (2013.01); *B64D 37/30* (2013.01); *F17C 1/00* (2013.01); *F17C 1/06* (2013.01); *F17C 13/083* (2013.01); *F17C 13/084* (2013.01); *F17C 2201/0109* (2013.01); *F17C 2201/056* (2013.01); *F17C 2203/0604* (2013.01); *F17C 2203/0619* (2013.01); *F17C 2203/0621* (2013.01); *F17C 2203/0646* (2013.01);
(Continued)

(58) Field of Classification Search
CPC ...... F17C 2203/0621; F17C 2205/0192; F17C 2205/018; F17C 2205/0188; F17C 2205/0184; F17C 2205/0153; F17C 2205/0103; F17C 2205/01; F17C 13/088; F17C 13/085; F17C 13/084; F17C 13/083; F17C 13/08; F17C 2205/0165; F17C 2205/0157; F17C 2205/00; F17C 2270/00; F17C 2270/01; F17C 2270/0189; F17C 2203/01; F17C 2203/014; F17C 2203/015; F17C 2203/016
USPC ......... 220/586, 588, 589, 590, 591, 58, 582, 220/583, 584, 585, 587, 592; 244/137.2; 182/48; 193/25 B
See application file for complete search history.

(56) References Cited

U.S. PATENT DOCUMENTS 1,843,245 A    2/1932  Sederland
1,897,163 A *  2/1933  Thomas ................... F17C 1/00
                                                   220/304
(Continued)

FOREIGN PATENT DOCUMENTS

CH    239535 A * 10/1945 ................ F17C 1/00
DE    2525214      2/1976
(Continued)

OTHER PUBLICATIONS

CH_239535_translation.pdf.*
(Continued)

*Primary Examiner* — J. Gregory Pickett
*Assistant Examiner* — Allan Stevens
(74) *Attorney, Agent, or Firm* — Snell & Wilmer L.L.P.

(57) ABSTRACT

Various embodiments of a compressed gas tank assembly are disclosed. According to various embodiments, a compressed gas tank assembly is provided comprising a liner, an inside fastener coupled to the liner, an attachment feature removably coupled to the inside fastener.

9 Claims, 5 Drawing Sheets

(51) Int. Cl.
  *B64D 37/04* (2006.01)
  *B64D 37/06* (2006.01)
  *B64D 37/30* (2006.01)
  *F17C 1/00* (2006.01)

(52) U.S. Cl.
  CPC .. *F17C 2203/0663* (2013.01); *F17C 2205/01* (2013.01); *F17C 2205/0153* (2013.01); *F17C 2205/0188* (2013.01); *F17C 2205/0192* (2013.01); *F17C 2221/011* (2013.01); *F17C 2221/013* (2013.01); *F17C 2221/014* (2013.01); *F17C 2223/0123* (2013.01); *F17C 2223/0153* (2013.01); *F17C 2223/033* (2013.01); *F17C 2223/035* (2013.01); *F17C 2223/036* (2013.01); *F17C 2270/0189* (2013.01)

(56) References Cited

U.S. PATENT DOCUMENTS

| | | | |
|---|---|---|---|
| 2,309,857 A * | 2/1943 | Middleditch | G11B 11/00 358/303 |
| 3,756,450 A | 9/1973 | Crose | |
| 4,005,762 A * | 2/1977 | Zephinie | A62B 1/20 182/48 |
| 4,336,899 A | 6/1982 | Price, II | |
| 5,862,938 A * | 1/1999 | Burkett | 220/592 |
| 6,341,789 B1 * | 1/2002 | Checa et al. | 280/47.28 |
| 6,508,477 B2 * | 1/2003 | Burkett | 280/47.26 |
| 6,536,722 B2 | 3/2003 | Sadowski et al. | |
| 2005/0001394 A1 * | 1/2005 | Gibby | B62B 1/125 280/47.26 |
| 2010/0230122 A1 * | 9/2010 | Machado | A62C 3/08 169/62 |
| 2013/0299505 A1 * | 11/2013 | Otsubo | B29C 53/602 220/590 |
| 2015/0159806 A1 * | 6/2015 | Nettis et al. | 220/562 |

FOREIGN PATENT DOCUMENTS

| | | | | |
|---|---|---|---|---|
| DE | 9115953 U1 * | 2/1992 | | A01C 3/02 |
| DE | 102008049990 A1 * | 4/2010 | | F17C 1/00 |
| FR | 1528867 A * | 6/1968 | | F17C 13/084 |
| WO | 2013083158 | 6/2013 | | |

OTHER PUBLICATIONS

DE_102008049990_translation.pdf.*
FR_1528867_translation.pdf.*
DE_9115953_translation.pdf.*
Extended European Search Report dated Aug. 25, 2016 in European Application No. 16161393.0.
Communication pursuant to Article 94(3) EPC dated Nov. 10, 2017 in European Application No. 16161393.0.

* cited by examiner

US 10,077,116 B2

COMPRESSED GAS TANK ASSEMBLY

FIELD

The present disclosure relates to compressed gas tank assemblies and more specifically to inflation cylinders for aircraft.

BACKGROUND

Compressed gas tank assemblies (or inflation cylinders) may be used with aircraft evacuation systems. Typically, a fabric bag is used to house the cylinder. The fabric cylinder bag is attached to a slide raft or life raft using fabric-webbing. Typically, the fabric cylinder bag is made of aerospace fabrics and manually assembled.

SUMMARY

Various embodiments of a compressed gas tank assembly are disclosed. According to various embodiments, a compressed gas tank assembly is provided comprising a liner, an inside fastener coupled to the liner, an attachment feature removably coupled to the inside fastener.

A compressed gas tank assembly is provided comprising a liner, an attachment feature coupled to the liner at a first end, a port disposed a second end of the compressed gas tank assembly.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "inflation cylinder" and "compressed gas tank" are used interchangeably.

Compressed gas tank assemblies (or inflation cylinders) may be used with aircraft evacuation systems. Typically, a fabric bag is used to house the cylinder. The fabric bag is attached to a slide raft or life raft using fabric webbing. Typically, the fabric bag is made of aerospace fabrics and manually assembled. However, in accordance with various embodiments, the fabric bag may be completely eliminated, reducing the overall weight and cost of the evacuation system.

Figure 1A:
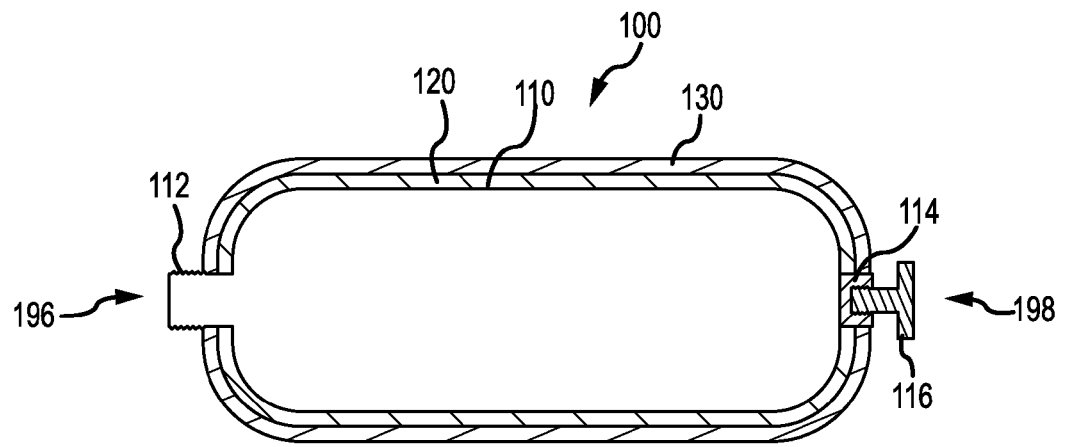
FIG. 1A illustrates a schematic view of an inflation cylinder with an attachment knob coupled to a liner, in accordance with various embodiments.

With reference to FIG. 1A, a cross sectional view of a compressed gas tank (CGT) assembly with an attachment knob is illustrated in accordance with various embodiments. The CGT assembly 100 may include a metal liner 110 that defines an interior volume of the CGT assembly 100. The interior volume may be filled with compressed gases and/or liquids. For example, compressed carbon dioxide and nitrogen gas ($N_2$) may occupy the interior volume of the CGT assembly 100. For example, compressed gaseous $N_2$ and liquid carbon dioxide may occupy the interior volume of the CGT assembly 100. Metal liner 110 helps prevent fluid (e.g., compressed gases or liquids) from leaking from the CGT assembly 100. Metal liner 110 may comprise any suitable metal, for example aluminum and/or aluminum alloys.

A carbon fiber shell 120 may be disposed on the outer surface of the metal liner 110. Carbon fiber shell 120 may comprise a shell or shells made of carbon fiber and/or other types of materials including composites (such as fiber reinforced polymers), nano-fabrics, and nano-materials. A fiberglass shell 130 may be disposed on the outer surface of the carbon fiber shell 120. The carbon fiber shell 120 and fiber glass shell 130 may be collectively referred to as a composite shell. According to various embodiments, an epoxy resin may be used to adhere the carbon fiber shell 120 to the metal liner 110 and the fiber glass shell 130 to the carbon fiber shell 120. Accordingly, the carbon fiber shell 120 and the fiber glass shell 130 may include an epoxy as part of the shell, according to various embodiments. The composite shell may be thicker (as measured from carbon fiber shell 120 to fiber glass shell 130) than the liner, according to various embodiments.

According to various embodiments, a charge/dis-charge port 112 may be disposed on a first end 196 of the CGT assembly 100. This port may be used to charge the CGT assembly 100 with a fluid. This port may also be used to discharge the CGT assembly 100 of fluid. According to various embodiments, a regulator may be attached to charge/dis-charge port 112 in order to regulate the flow of fluid through charge/dis-charge port 112. Although charge/discharge port 112 is shown in FIG. 1A as having external threading, it should be known that the material, according to various embodiments, disclosed herein is equally as applicable to cylinders with charge/dis-charge ports having internal threading.

According to various embodiments, CGT assembly 100 may be configured to store any fluid including at least one or more of oxygen, nitrogen, and carbon dioxide, for example. According to various embodiments, CGT assembly 100 may be configured to be pressurized to a predetermined pressure. According to various embodiments, CGT assembly 100 may be configured to be pressurized up to at least 5000 pounds per square inch gauge (psig) of pressure. In various embodiments, CGT assembly 100 may be configured to be pressurized from about 2000 psig to about 5000 psig, where the term "about" in this context only means+/- 100 psig.

According to various embodiments, an inside fastener 114 may be disposed on the outer surface of metal liner 110 and at least partially within the composite shell. With reference to FIG. 1A, the inside fastener 114 is illustrated on a second end 198 of CGT assembly 100. According to various embodiments, the inside fastener 114 may be attached to any portion of the outer surface of metal liner 110. Inside fastener 114 may be coupled to metal liner 110 before the composite shell is added to metal liner 110. According to various embodiments, the deposition of the composite shell may add to the strength of inside fastener 114. According to various embodiments, inside fastener 114 may include a threaded portion configured to attach to attachment feature 116. Inside fastener 114 may be coupled to metal liner 110 in any suitable manner. For example, inside fastener 114 may be welded to metal liner 110.

Figure 1B:
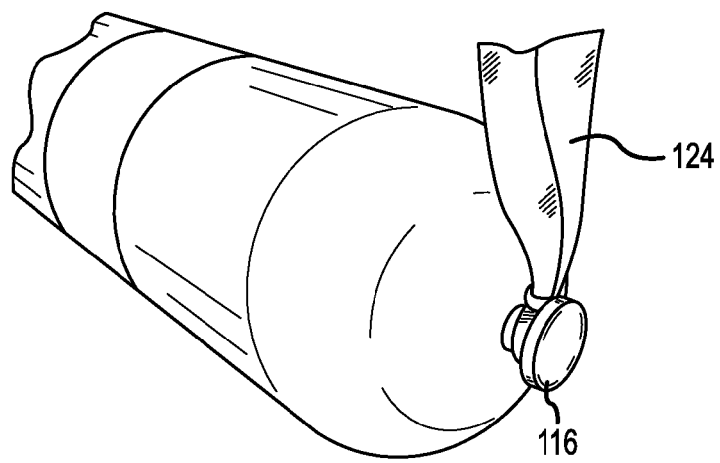
FIG. 1B illustrates an isometric view of an inflation cylinder with an attachment knob coupled to the liner, in accordance with various embodiments.

With further reference to FIG. 1B, an isometric view of a compressed gas tank (CGT) assembly with an attachment knob is illustrated in accordance with various embodiments. According to various embodiments, attachment feature 116 may comprise an attachment knob (or knob). According to various embodiments, attachment feature 116 may be threaded onto inside fastener 114. According to various embodiments, attachment feature 116 may be attached to inside fastener 114 via any suitable method. According to various embodiments, attachment feature 116 may be configured to be removable from CGT assembly 100. In that regard, attachment feature 116 may comprise a threaded portion that engages with a threaded portion of inside fastener 114.

Figure 2A:
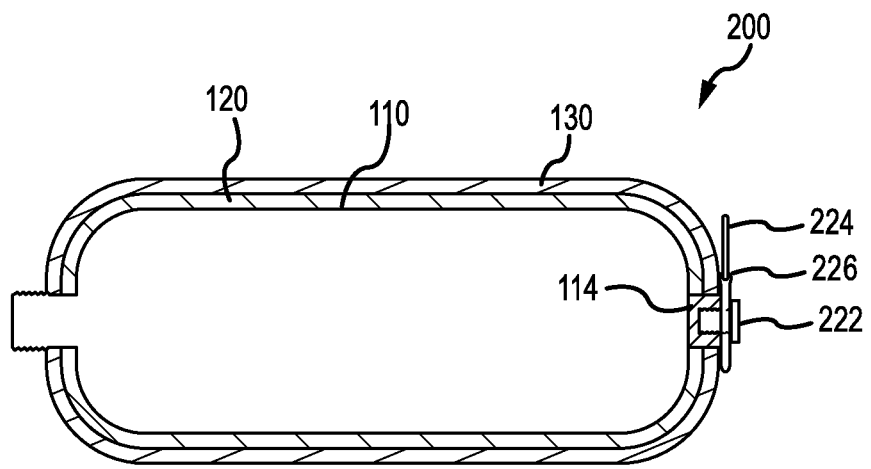
FIG. 2A illustrates a schematic view of an inflation cylinder with an attachment loop coupled to the liner, in accordance with various embodiments.
Figure 2B:
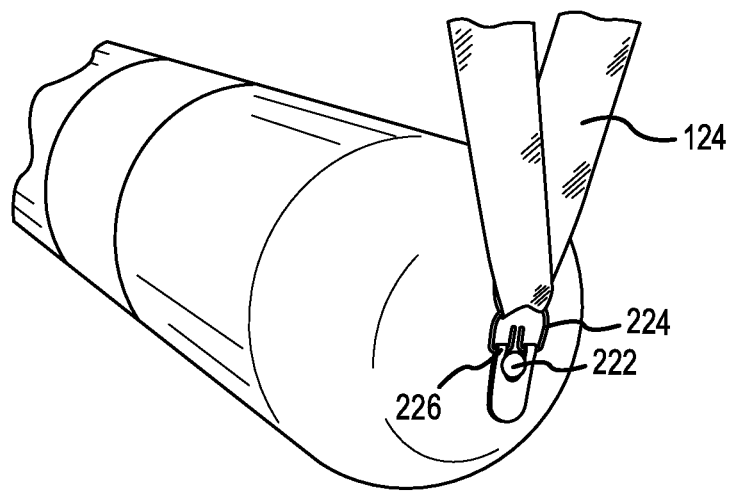
FIG. 2B illustrates an isometric view of an inflation cylinder with an attachment loop coupled to the liner, in accordance with various embodiments.

According to various embodiments, attachment feature 116 may be configured to be coupled to a securing element 124. According to various embodiments, securing element 124 may be used to secure CGT assembly 100 to at least a portion of an aircraft. According to various embodiments, securing element 124 may be used to secure CGT assembly 100 in a secure position. According to various embodiments, securing element 124 may be coupled to attachment feature 116 via any method, including a knot, for example. Securing element 124 may comprise at least one of wire, cable, webbing (e.g., nylon or polyester webbing) rope, string, and tape. According to various embodiments, securing element 124 may comprise any material including polyesters, nylon, rayon, polypropylene, and metal, for example, With reference to FIG. 2A, a schematic view of a compressed gas tank (CGT) assembly 200 with an attachment loop coupled to the cylinder is illustrated in accordance with various embodiments. According to various embodiments, an attachment feature may comprise an attachment loop 224. According to various embodiments, attachment loop 224 may comprise a fixed loop. According to various embodiments, attachment loop 224 may comprise a loop configured to rotate about a pivot 226. According to various embodiments, attachment loop 224 may be attached to inside fastener 114 via outside fastener 222. With reference to FIG. 2B, attachment loop 224 may be configured to be coupled to securing element 124, in accordance with various embodiments.

Figure 3A:
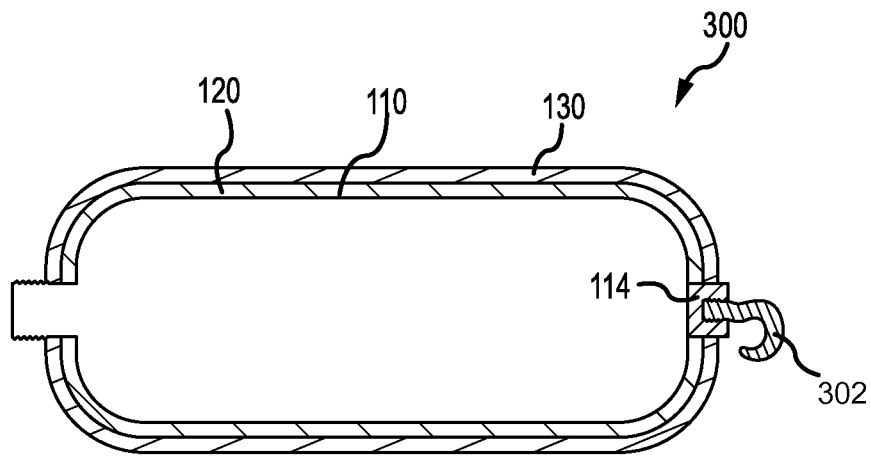
FIG. 3A illustrates a schematic view of an inflation cylinder with an attachment hook coupled to the liner, in accordance with various embodiments.
Figure 3B:
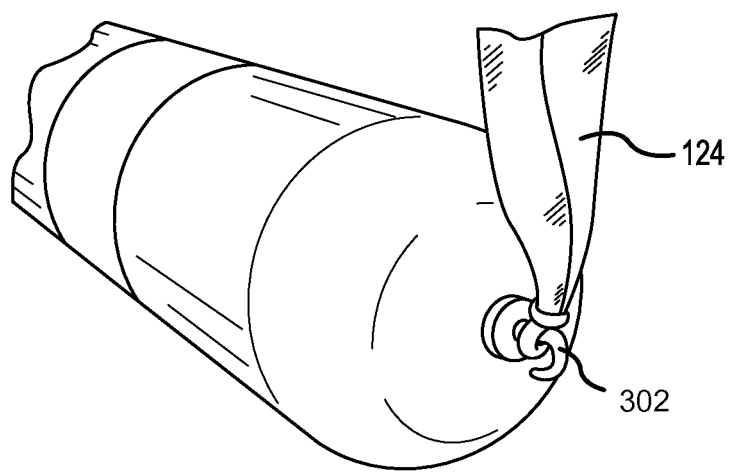
FIG. 3B illustrates an isometric view of an inflation cylinder with an attachment hook coupled to the liner, in accordance with various embodiments.

With reference to FIG. 3A, a schematic view of a compressed gas tank (CGT) assembly 300 with an attachment hook coupled to the cylinder is illustrated in accordance with various embodiments. According to various embodiments, an attachment feature may comprise an attachment hook 302. The attachment hook 302 may comprise metal or other suitable material that is curved or bent back at an angle. The attachment hook 302 may be configured to attach to inside fastener 114. With reference to FIG. 3B, and as previously mentioned, attachment feature 116 may be configured to be coupled to securing element 124, in accordance with various embodiments.

According to various embodiments, attachment feature 116 may comprise any geometric shape wherein the shape allows for attachment of securing element 124.

Figure 4A:
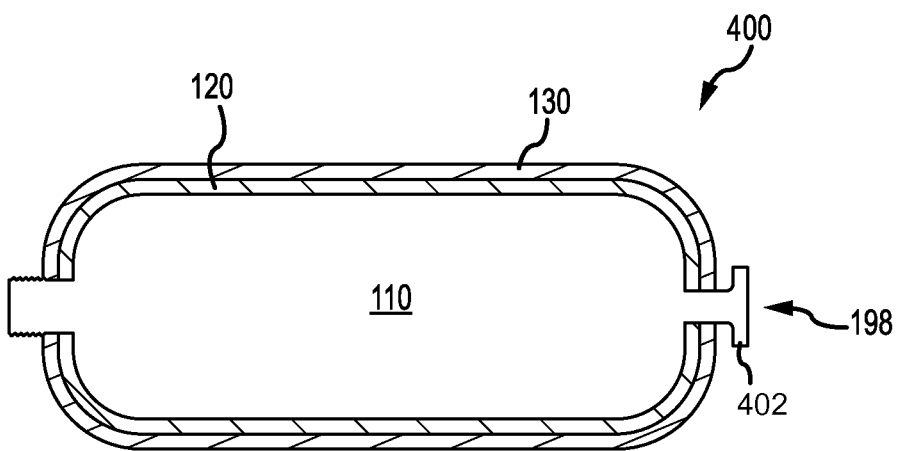
FIGS. 4A, 4B, and 4C illustrates a schematic view of an inflation cylinder with an attachment feature coupled to the liner, in accordance with various embodiments.

According to various embodiments, FIG. 4A illustrates a schematic view of CGT assembly 400 with an attachment knob integrally connected to the cylinder. According to various embodiments, CGT assembly 400 may comprise an attachment feature comprising an attachment knob 402 integrally coupled to metal liner 110. Attachment knob 402 may be present during the deposition process used to form the composite shell onto the metal liner 110. A securing element, such as securing element 124 (with brief reference to FIG. 1B) may be coupled to attachment knob 402, in accordance with various embodiments. The integration of attachment knob 402 and metal liner 110 eliminates the need of a fastener to couple attachment knob 402 to metal liner 110. Accordingly, attachment knob 402 may not be removed from metal liner 110.

Figure 4B:
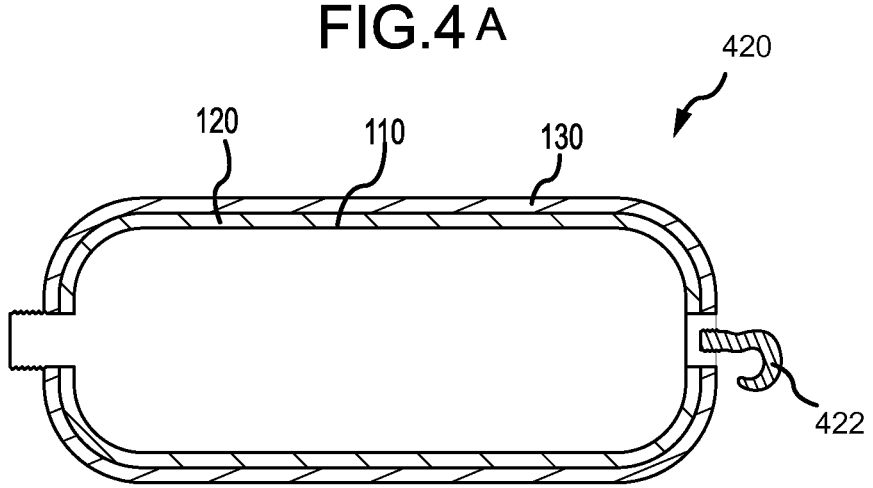

According to various embodiments, FIG. 4B illustrates a schematic view of CGT assembly 420 with an attachment hook integrally connected to the cylinder. According to various embodiments, CGT assembly 420 may comprise an attachment feature comprising an attachment hook 422 integrally coupled to metal liner 110. Attachment hook 422 may be present during the deposition process used to form the composite shell onto the metal liner 110. A securing element, such as securing element 124 (with brief reference to FIG. 1B) may be coupled to attachment hook 422, in accordance with various embodiments. The integration of attachment hook 422 and metal liner 110 eliminates the need of a fastener to couple attachment hook 422 to metal liner 110. Accordingly, attachment hook 422 may not be removed from metal liner 110.

Figure 4C:
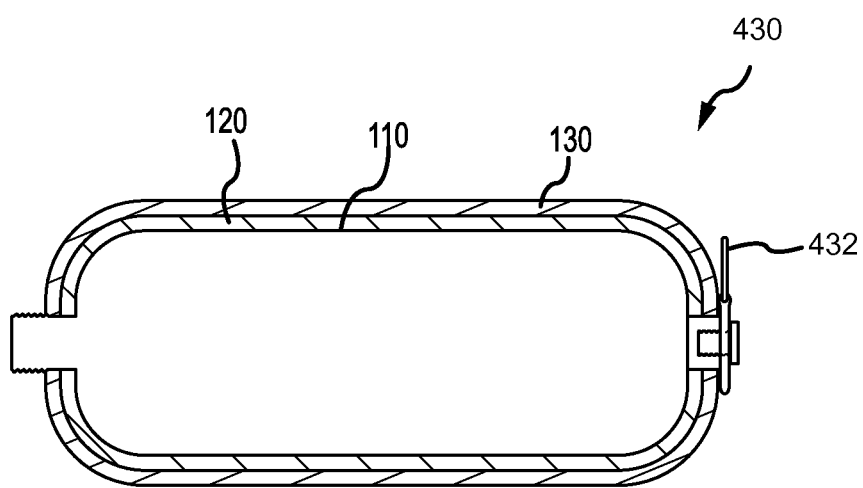

According to various embodiments, FIG. 4C illustrates a schematic view of CGT assembly 430 with an attachment loop integrally connected to the cylinder. According to various embodiments, CGT assembly 430 may comprise an attachment feature comprising an attachment loop 432 integrally coupled to metal liner 110. Attachment loop 432 may present during the deposition process used to form the composite shell onto the metal liner 110. A securing element, such as securing element 124 (with brief reference to FIG. 1B) may be coupled to attachment loop 432, in accordance with various embodiments. The integration of attachment loop 432 and metal liner 110 eliminates the need of a fastener to couple attachment loop 432 to metal liner 110. Accordingly, attachment loop 432 may not be removed from metal liner 110.

Various embodiments of inflation cylinders, as described herein, may conform to one or more government regulations, for example, regulations promulgated by the U.S. Department of Transportation (USDOT) as codified in, for example, 49 C.F.R. § 180 and, more specifically, 49 C.F.R. §§ 180.201-180.217. In various embodiments, inflation cylinders described herein may not conform to USDOT regulations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A compressed gas tank assembly for an aircraft evacuation system comprising:
    a liner comprising a cylindrical geometry and having a centerline axis;
    a carbon fiber shell enveloping the liner;
    a fiberglass shell enveloping the carbon fiber shell;
    a port for at least one of charging and dis-charging the gas tank assembly;
    an inside fastener coupled to the liner, the inside fastener comprising a first threaded portion;
    an outside fastener comprising a second threaded portion; and
    an attachment feature comprising a loop configured to rotate about a pivot, the loop removably coupled to the inside fastener via the outside fastener,
    a securing element configured to secure the compressed gas tank assembly to a portion of an aircraft, a portion of the securing element passing through the loop,
    the inside fastener disposed at least partially within at least one of the carbon fiber shell or the fiberglass shell,
    the inside fastener is located at a first end of the compressed gas tank assembly and being concentric with the liner,
    the port is located at a second end of the compressed gas tank assembly and being concentric with the liner, and
    the first end and the second end are opposite ends of the compressed gas tank assembly.

2. The compressed gas tank assembly of claim 1, wherein the liner comprises at least of an aluminum or aluminum alloy.

3. The compressed gas tank assembly of claim 1, wherein the attachment feature is coupled to the securing element, the securing element comprising at least one of a wire, a cable, a nylon webbing, a polyester webbing, a rope, a string, or a tape.

4. The compressed gas tank assembly of claim 1, wherein the compressed gas tank assembly is configured to hold between 2,000 psig and 5,000 psig of at least one of nitrogen or carbon dioxide.

5. A compressed gas tank assembly for an aircraft evacuation system comprising:
    a liner comprising a cylindrical geometry and having a centerline axis;
    a carbon fiber shell enveloping the liner;
    a fiberglass shell enveloping the carbon fiber shell;
    an attachment feature a securing element configured to secure the compressed gas tank assembly to a portion of an aircraft, the attachment feature comprising a loop configured to rotate about a pivot and a portion of the securing element passing through the loop;
    an outside fastener coupled directly to the liner via a threaded portion of the outside coupler, wherein the loop is removably coupled to the liner via the outside fastener; and
    a port disposed on a second end of the compressed gas tank assembly for at least one of charging and discharging the gas tank assembly,
    the outside fastener disposed at least partially within at least one of the carbon fiber shell or the fiberglass shell,
    wherein the port is concentric with the liner,
    the attachment feature is concentric with the liner, and
    the first end and the second end are opposite ends of the compressed gas tank assembly.

6. The compressed gas tank assembly of claim 5, wherein the liner comprises at least of an aluminum or aluminum alloy.

7. The compressed gas tank assembly of claim 6, wherein the attachment feature and the liner are integrally coupled.

8. The compressed gas tank assembly of claim 6, wherein the attachment feature is coupled to the securing element, wherein the securing element comprises at least one of a wire, a cable, a nylon webbing, a polyester webbing, a rope, a string, or a tape.

9. The compressed gas tank assembly of claim 8, wherein the compressed gas tank assembly is configured to hold between 2,000 and 5,000 psig of at least one of nitrogen or carbon dioxide.

* * * * *